US008511219B2

(12) United States Patent
Tackett et al.

(10) Patent No.: US 8,511,219 B2
(45) Date of Patent: Aug. 20, 2013

(54) ZERO EMISSIONS RECIPROCATING PUMP

(75) Inventors: Herbert H. Tackett, Augusta, MI (US); James A. Cripe, Bellevue, MI (US); Gary Dyson, Dukinfield (GB); Peter Thompson, Huddersfield (GB)

(73) Assignee: Clyde Union Inc., Battle Creek, MI (US)

( * ) Notice: Subject to any disclaimer, the term of this patent is extended or adjusted under 35 U.S.C. 154(b) by 796 days.

(21) Appl. No.: 12/761,644

(22) Filed: Apr. 16, 2010

(65) Prior Publication Data
US 2010/0253007 A1 Oct. 7, 2010

Related U.S. Application Data

(63) Continuation-in-part of application No. 11/729,439, filed on Mar. 28, 2007, now Pat. No. 7,784,395.

(51) Int. Cl.
*F04B 53/16* (2006.01)
*F16J 10/00* (2006.01)

(52) U.S. Cl.
USPC .......................................... 92/165 R; 277/926

(58) Field of Classification Search
USPC .................... 92/165 R, 86; 277/926
See application file for complete search history.

(56) References Cited

U.S. PATENT DOCUMENTS

| | | | |
|---|---|---|---|
| 2,628,112 A | 2/1953 | Hebard | |
| 3,907,307 A | 9/1975 | Maurer et al. | |
| 4,858,937 A | 8/1989 | Fairlie-Clarke et al. | |
| 4,960,039 A * | 10/1990 | Robertson | 92/165 R |
| 4,991,495 A * | 2/1991 | Loegel et al. | 92/165 R |
| 5,209,495 A | 5/1993 | Palmour | |
| 5,412,977 A | 5/1995 | Schmohl et al. | |
| 5,498,007 A | 3/1996 | Kulkarni et al. | |
| 5,865,441 A | 2/1999 | Orlowski | |
| 5,906,374 A | 5/1999 | Arbuckle | |
| 6,158,967 A | 12/2000 | Dupre | |
| 6,210,107 B1 | 4/2001 | Volden et al. | |
| 6,302,401 B1 | 10/2001 | Palmour | |
| 6,330,790 B1 | 12/2001 | Arora et al. | |
| 6,428,011 B1 | 8/2002 | Oskouei | |
| 6,708,981 B2 | 3/2004 | Hall et al. | |
| 7,118,114 B2 | 10/2006 | Burdick et al. | |
| 7,669,858 B2 | 3/2010 | Tahir et al. | |

(Continued)

OTHER PUBLICATIONS

Palmour, Harold H.; "New Technology to Protect the Environment When Sealing Fluids or Gases Under Pressure"; The Ninth International Petroleum Environmental Conference; Albuquerque, NM; Oct. 22-25, 2002; 12 pages.

(Continued)

*Primary Examiner* — Thomas E Lazo
(74) *Attorney, Agent, or Firm* — Baker & Hostetler LLP

(57) ABSTRACT

A sealing system for a pump includes a housing having an internal chamber adapted to receive a portion of a plunger. A primary seal is translatable within the chamber in sealing relation with the housing. The primary seal includes first and second elastomeric members adapted to sealingly engage the plunger. The first and second elastomeric members are spaced apart from one another a distance greater than or equal to a maximum stroke of the plunger. A secondary seal is spaced apart from the primary seal and adapted to sealingly engage the plunger. A chamber contains a barrier fluid in contact with the primary seal and the secondary seal. A pressurizing device maintains a pressure of barrier fluid at a magnitude greater than a peak pressure of a fluid pumped by the plunger such that the pumped fluid is restricted from entering the barrier fluid chamber.

19 Claims, 6 Drawing Sheets

(56) References Cited

U.S. PATENT DOCUMENTS 7,784,395 B2 8/2010 Tackett et al.
8,074,999 B2 12/2011 Burdick et al.

OTHER PUBLICATIONS

Giangiacomo, P.E., Leo A.; "Hydro-Balanced Stuffing Box Field Test"; Prepared for the U.S. Department of Energy; Rocky Mountain Oilfield Testing Center; Casper, WY; May 29, 1999; pp. 1-13 (17 pages with cover sheets).

Nesbitt B: "Stuffing Box Designs for Reciprocating Pumps" World Pumps, Elsevier, Oxford, GB, No. 328, Jan. 1, 1994, pp. 34-43, XP000419132, ISSN: 0262-1762.

European Search Report for European Application No. EP08102965 dated Jun. 30, 2009.

* cited by examiner

ZERO EMISSIONS RECIPROCATING PUMP

CROSS-REFERENCE TO RELATED APPLICATIONS

This application is a continuation-in-part of U.S. patent application Ser. No. 11/729,439 filed on Mar. 28, 2007. The entire disclosure of the above application is incorporated herein by reference.

BACKGROUND

The present disclosure generally relates to pumping systems and, more particularly, to a sealing arrangement for a pumping system.

Pumping systems have been used to pump petroleum and petro-chemical products at pumping well installations for some time. Other pumping systems have been utilized to transfer fluids where spills and leaks from the pumping system may contaminate the environment. Reducing or eliminating environmental contamination is a primary concern for manufacturers of these pumping systems.

One pumping system manufacturer has provided a stuffing box seal assembly including a first seal and a second seal separated by an environmentally safe fluid-filled inner chamber. The first seal separates the inner chamber from the atmosphere while the second seal separates the inner chamber from the fluid being pumped. The sacrificial environmentally safe fluid is stored in a reservoir and transmitted to the inner chamber. The inner chamber pressure varies throughout the pumping operation but remains at a slightly higher pressure than the fluid being pumped. While this system has reduced environmental contamination, a need exists for an improved sealing arrangement for pumping systems.

SUMMARY

A sealing system for a pump having a plunger includes a housing having an internal chamber adapted to receive a portion of the plunger. A primary seal is axially translatable within the internal chamber and in sealing relation with the housing. The primary seal includes first and second elastomeric members adapted to sealingly engage the plunger. The first and second elastomeric members are spaced apart from one another a distance greater than or equal to a maximum stroke of the plunger. A secondary seal is located within the internal chamber and adapted to sealingly engage the plunger. The secondary seal is spaced apart from the primary seal. A barrier fluid chamber contains a barrier fluid in contact with the primary seal and the secondary seal. A pressurizing device maintains a pressure of barrier fluid at a magnitude greater than a peak pressure of a fluid pumped by the plunger such that the pumped fluid is restricted from entering the barrier fluid chamber.

A sealing system for a pump having a reciprocating plunger is also disclosed. The system includes a housing having an internal chamber adapted to receive a portion of the plunger. A primary seal is positioned within the internal chamber in sealing relation with the housing and includes first and second elastomeric members adapted to sealingly engage the plunger, the first and second elastomeric members being spaced apart from one another by an axially moveable sleeve a distance greater than or equal to a maximum stroke of the plunger. A secondary seal is located within the internal chamber and adapted to sealingly engage the plunger. The secondary seal is spaced apart from the primary seal. A barrier fluid chamber contains a barrier fluid and is defined by the second elastomeric member and the secondary seal. A pressurizing device maintains a pressure of the barrier fluid at a magnitude greater than a peak pressure of a fluid pumped by the plunger such that the pumped fluid is restricted from entering the barrier fluid chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
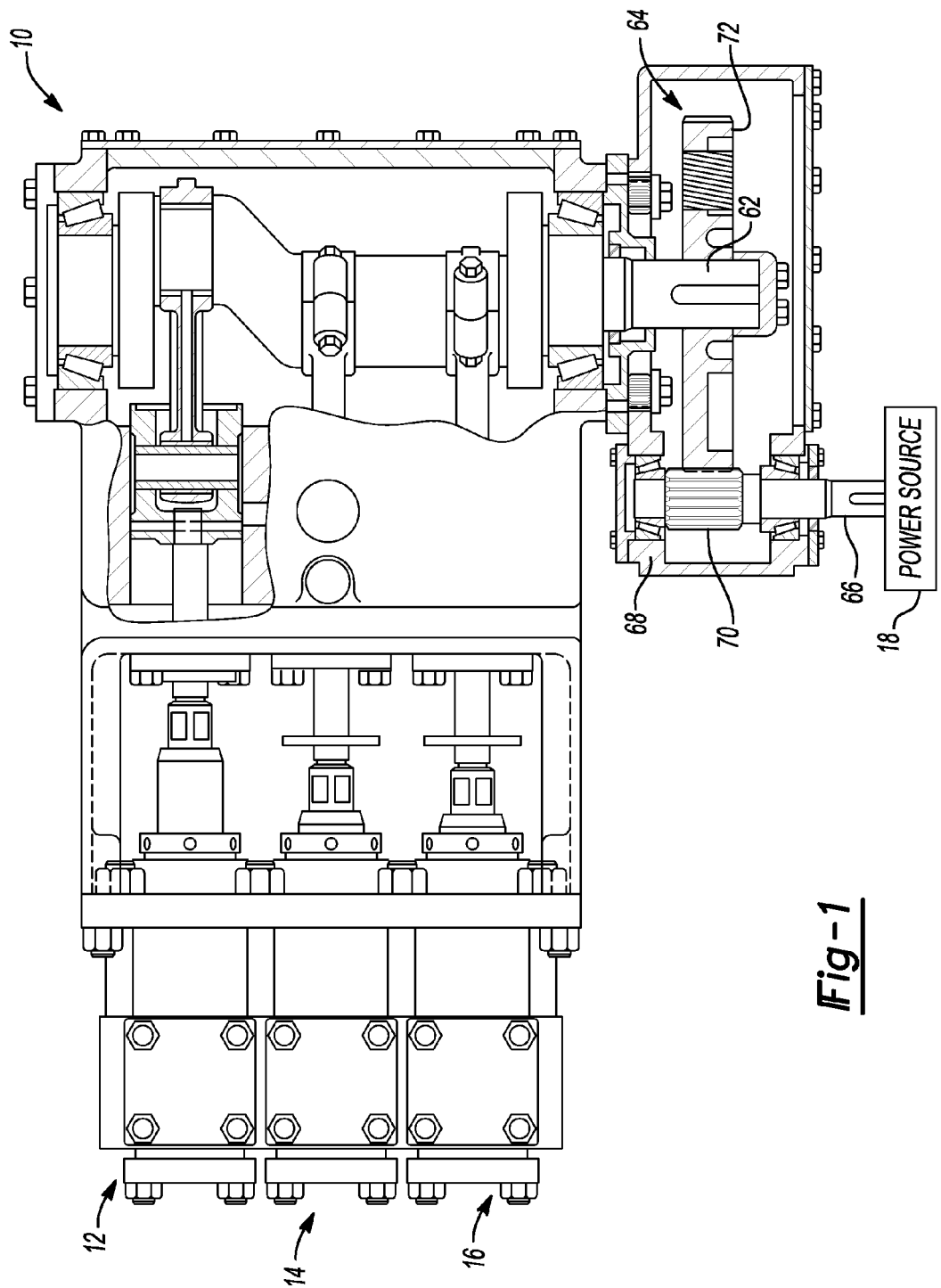
FIG. 1 is a partially sectioned plan view of an exemplary power pump equipped with a sealing system constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

Figure 2:
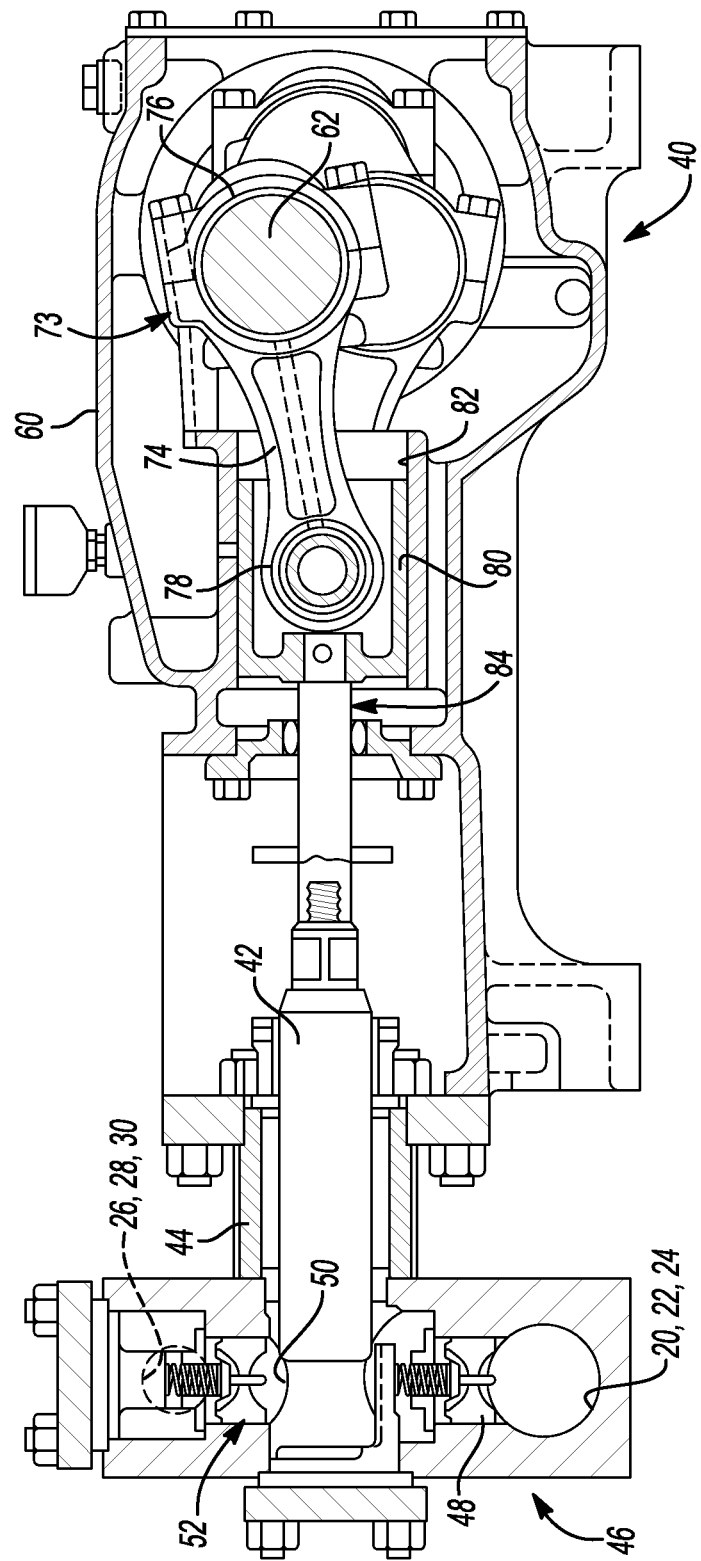
FIG. 2 is a cross-sectional side view of the power pump depicted in FIG. 1.
Figure 3:
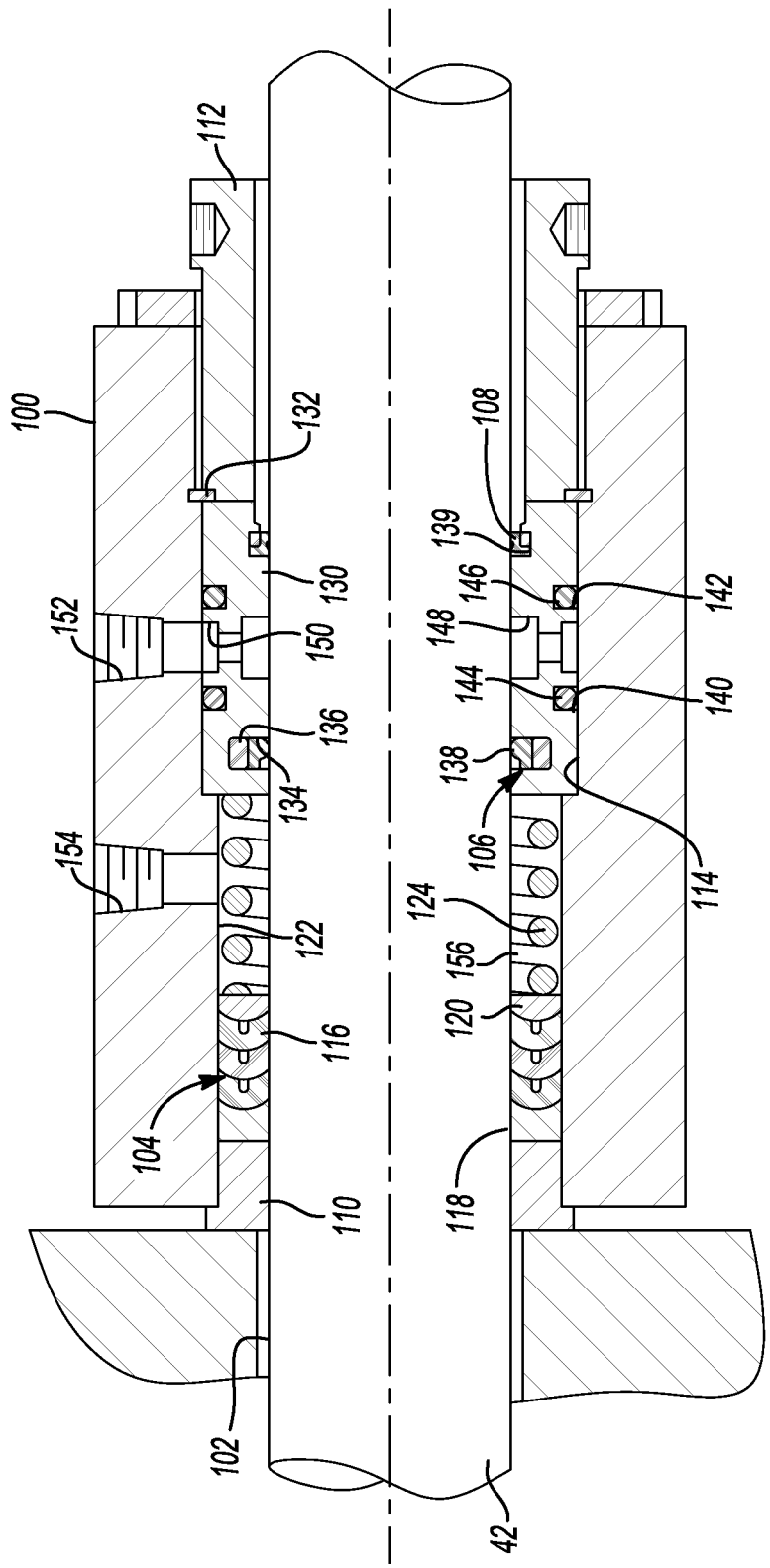
FIG. 3 is a fragmentary side view of the power pump showing an enlarged view of the stuffing box.

An exemplary power pump 10 is depicted in FIGS. 1 and 2. Power pump 10 is a reciprocating piston type pump having first, second and third plunger assemblies 12, 14, 16 driven by a power source 18. Each plunger 12, 14, 16 includes a suction port 20, 22, 24 and a discharge port 26, 28, 30, respectively. Plungers 12, 14, 16 are substantially similar to one another. Accordingly, power pump 10 will be described in detail only in relation to plunger 16.

Power pump 10 includes a drive unit 40, a reciprocating plunger 42, a stuffing box 44 and a fluid cylinder 46. Plunger 42 is coupled to drive unit 40 for axial reciprocating motion within fluid cylinder 46 and stuffing box 44. Plunger 42 is moveable between an extended position and a retracted position. FIG. 2 illustrates plunger 42 at a partially extended position. Movement of plunger 42 from the extended position to the retracted position causes pumped fluid to enter suction port 24. During retraction of plunger 42 a suction valve 48 opens to allow pumped fluid to enter a central cavity 50 formed within fluid cylinder 46. Plunger 42 is also in communication with central cavity 50. A discharge valve 52 is positioned between central cavity 50 and discharge port 30. During the retraction stroke, discharge valve 52 is closed. When the direction of travel of plunger 42 is reversed to cause plunger 42 to move from the retracted position toward the extended position, suction valve 48 closes while plunger 42 is driven into central cavity 50. Fluid previously positioned with central cavity 50 is pressurized. Discharge valve 52 opens to allow the pressurized pumped fluid to exit discharge port 30.

Drive unit 40 includes a crankcase 60 rotatably supporting a crankshaft 62. A gear train 64 drivingly interconnects crankshaft 62 to power source 18. Gear train 64 includes an input shaft 66 rotatably supported in a gear housing 68. Input shaft 66 includes a drive gear 70 rotatably fixed thereto. A driven gear 72 is in meshed engagement with drive gear 70. Driven gear 72 is fixed for rotation with crankshaft 62. Accordingly, torque input provided by power source 18 rotates input shaft 66 which in turn rotates drive gear 70, driven gear 72 and crankshaft 62.

A first end 73 of a connecting rod 74 is rotatably coupled to a journal 76 formed on crankshaft 62. Journal 76 has a center offset from an axis of rotation of crankshaft 62 such that journal 76 follows an eccentric path upon rotation of camshaft 62. A second end 78 of connecting rod 74 is rotatably coupled to a cross head 80. Cross head 80 is slidably received within a bore 82 formed in crankcase 60. A first end 84 of plunger 42 is fixed to cross head 80. As such, rotation of crankshaft 62 causes reciprocating linear motion of cross head 80 and plunger 42.

Stuffing box 44 interconnects drive unit 40 and fluid cylinder 46. Stuffing box 44 includes a cylinder 100 in receipt of a portion of plunger 42. Within cylinder 100, plunger 42 is shaped as a cylinder having an outer surface 102 with a substantially constant outer diameter. Stuffing box 44 functions to guide plunger 42 along a desired path while preventing pumped fluid positioned within fluid cylinder 46 from escaping to the environment. Stuffing box 44 also performs the functions of providing a lubricant to outer surface 102 to reduce wear between plunger 42 and the seals surrounding the plunger.

In particular, stuffing box 44 includes a primary seal 104, a secondary seal 106 and tertiary seal 108 positioned within cylinder 100 in communication with plunger 42. A throat bushing 110 is inserted at one end of cylinder 100 and is sized to guide plunger 42 along its axis of translation. A threaded retainer 112 is fixed to the opposite end of cylinder 100 and functions to retain secondary seal 106 and tertiary seal 108 within a counterbore 114 formed within cylinder 100.

Primary seal 104 includes three "V" rings 116, captured between a first end plate 118 and a second end plate 120. Each of the components of primary seal 104 are axially moveable within a bore 122 formed in cylinder 100. A spring 124 imparts a predetermined compressive load on primary seal 104 in the static state. As will be described in greater detail, primary seal 104 is maintained in axial compression by spring 124 during pump operation.

Secondary seal 106 and tertiary seal 108 are mounted within a casing 130 retained within counterbore 114 by a ring 132. Casing 130 includes an internal groove 134 in receipt of secondary seal 106. Secondary seal 106 may be constructed as a multi-component seal having an O-ring 136 bottomed within groove 134 and a wiper 138 positioned in engagement with outer surface 102 of plunger 42. O-ring 136 acts as a spring to biasedly engage wiper 138 with plunger 42. It should be appreciated that the secondary seal may be constructed as a one-piece elastomer or may have an alternative form. For example, secondary seal 106 may be equipped with a single or multiple lips in contact with outer surface 102 without departing from the scope of the present disclosure. Tertiary seal 108 is constructed from an elastomer and positioned within a groove 139 formed within casing 130. Tertiary seal 108 engages outer surface 102 of plunger 42.

First and second outer grooves 140, 142 are formed in casing 130. A first outer o-ring 144 is positioned within groove 140 and a second outer o-ring 146 is positioned within outer groove 142. O-rings 144, 146 are placed in biased engagement with counterbore 114 to prevent fluid passage between casing 130 and cylinder 100. A plurality of passageways 148 radially extend through casing 130 in communication with an outer groove 150 formed on casing 130. Outer groove 150 is aligned with a leakage port 152 radially extending through cylinder 100. An inlet port 154 also radially extends through cylinder 100. Inlet port 154 communicates with a barrier fluid cavity 156 in receipt of spring 124. An environmentally safe barrier fluid is provided to barrier fluid cavity 156.

Figure 4:
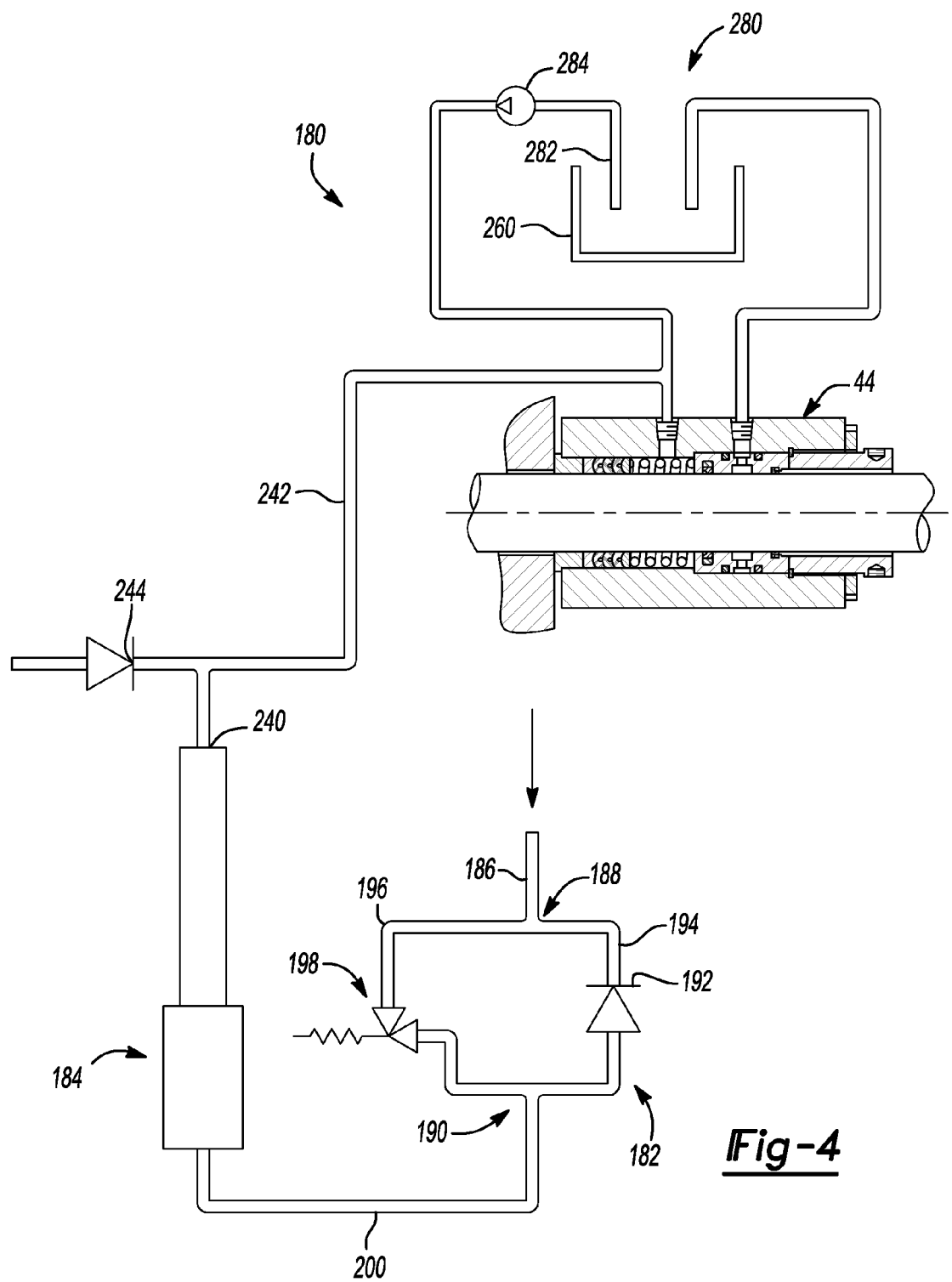
FIG. 4 is a hydraulic schematic representing the sealing system for the power pump.

FIG. 4 depicts a hydraulic schematic of a sealing system 180 constructed in accordance with the teachings of the present disclosure. Sealing system 180 includes stuffing box 44, a pressure referencing device 182 and a pressurizing device 184. Sealing system 180 is operable to provide pressurized barrier fluid to barrier fluid cavity 156 at a pressure consistently exceeding the peak discharge pressure of power pump 10. One skilled in the art will appreciate that based on the reciprocating nature and multiple piston arrangement previously defined in relation to power pump 10, the discharge pressure provided by power pump 10 pulsates between a low pressure value and a high pressure value for each cycle of plunger 42. Furthermore, depending on the physical characteristics of the fluid being pumped, such as viscosity and temperature among others, the magnitude of the high pressure may vary over time. The highest pressure reached during pumping is referred to as the peak pressure.

Sealing system 180 includes a first line 186 plumbed in communication with discharge ports 26, 28, 30 from each of plungers 12, 14, 16. Accordingly, a pulsating discharge pressure signal is provided to an inlet 188 of pressure referencing device 182. Pressure referencing device 182 is operable to output and maintain the peak pressure sensed at inlet 188 to an outlet 190. Pressure referencing device 182 includes a one-way check valve 192 positioned in a first fluid branch 194. As pressure is provided to inlet 188 from the discharge of power pump 10, one-way check valve 192 operates to maintain the peak pressure at outlet 190. Fluid is allowed to flow to outlet 190 through one-way check valve 192 when pressure within line 186 is greater than the pressure at outlet 190. Flow in the reverse direction is restricted.

Pressure referencing device 182 includes a second fluid branch 196 positioned in parallel with first fluid branch 194. A differential pressure valve 198 is plumbed within second fluid branch 196. Differential pressure valve 198 normally remains closed. However, when a predetermined pressure differential exists across valve 198, it opens to allow fluid to pass from the pump discharge to outlet 190. Pressure differential valve 198 is provided to account for a condition where an insufficient quantity of fluid is positioned in a line 200 interconnecting outlet 190 and pressurizing device 184. This condition may occur when the discharge pressure reduces a relatively large amount.

Figure 5:
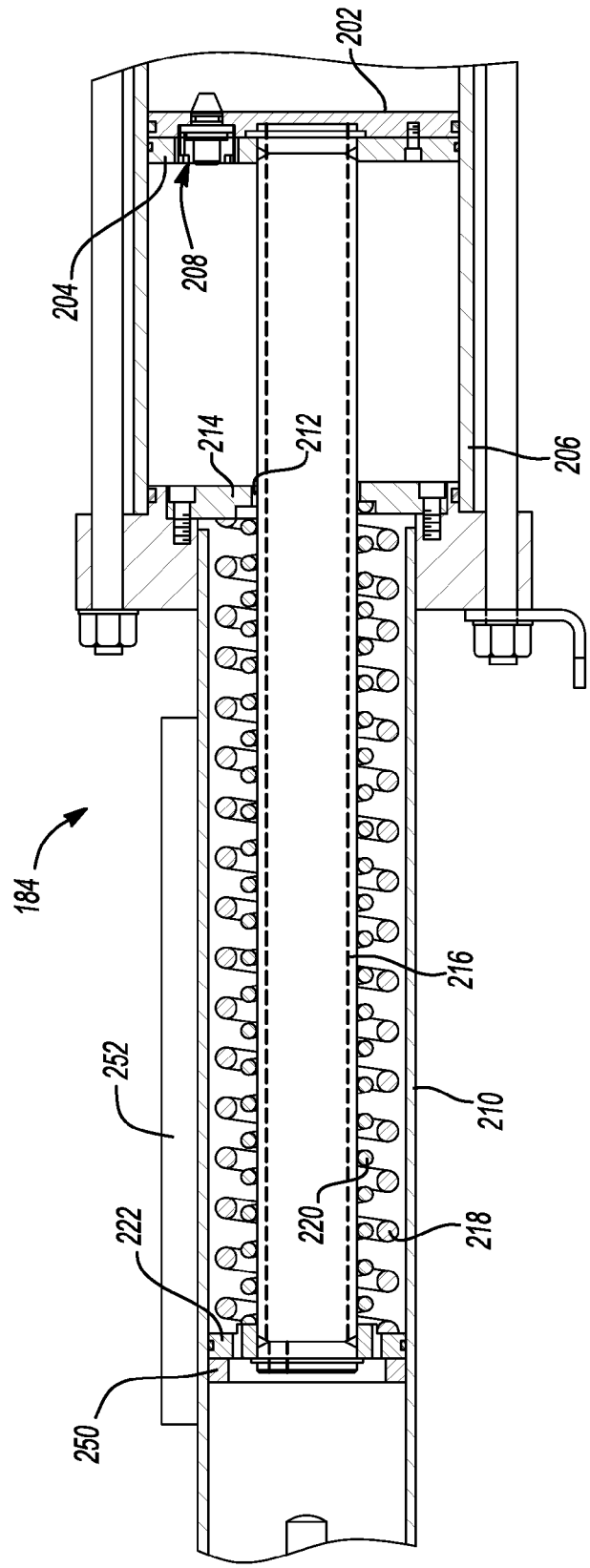
FIG. 5 is a cross-sectional side view of a pressurizing device of the sealing system shown in FIG. 4.

As shown in FIG. 5, pressurized fluid within line 200 acts on a first surface 202 of a piston 204 positioned within a housing 206 of pressurizing device 184. Barrier fluid is located on an opposite face 208 of piston 204. A pipe 210 is fixed to housing 206. Barrier fluid is allowed to pass through an aperture 212 formed in a plate 214 located at the intersection between pipe 210 and housing 206. A tube 216 is fixed to piston 204. Tube 216 extends through aperture 212 such that a portion of tube 216 is located within housing 206 and another portion is located within pipe 210.

First and second springs 218, 220, are captured between plate 214 and a stop 222 fixed to the distal end of tube 216. Springs 218, 220 apply a force to piston 204 to assure that the pressure of the barrier fluid is always greater than the peak pressure provided from the pump discharge. This is accomplished by pre-loading springs 218, 220 to apply a force to piston 204 regardless of its axial position. In one example, the pressure of the barrier fluid acting on surface 208 of piston 204 exceeds the peak pressure on surface 202 of piston 204 by at least one bar. It is contemplated that tube 216 is axially moveable between retracted and extended positions. At the retracted position, springs 218, 220 are fully compressed and the pressure of the barrier fluid is approximately two bar greater than the pressure acting on surface 202. At the fully extended position of tube 216, springs 218, 220 are at their fully extended position and the pressure of the barrier fluid is one bar greater than the pressure acting on surface 202 of piston 204. It should be appreciated that the 1 bar to 2 bar pressure range is merely exemplary and other pressure increase ranges may be implemented. Furthermore, while the spring arrangement within pressurizing device 184 provides a simple mechanical method for providing increased output pressure, other pressurizing devices may be used without department from the scope of the present disclosure.

Pressurized barrier fluid exits pressurizing device 184 at an outlet 240. A line 242 provides pressurized barrier fluid to inlet port 154 of stuffing box 44. A fill port 244 may be provided in line 242 to allow a user to add barrier fluid to the system. A barrier fluid level detection system may optionally be employed to inform a user of sealing system 180 to the location of piston 204 and a possible need to add barrier fluid to the system. A magnetic ring 250 is fixed to tube 216 and translates as piston 204 translates. A position indicator 252 senses the axial position of magnetic ring 250 and outputs a signal indicative of the magnetic ring's position. The axial position of magnetic ring 250 correlates to the position of piston 204 and how close the piston 204 may be to bottoming out against plate 214. Barrier fluid may be added in response to the position signal to assure this condition does not occur.

Operation of power pump 10 and sealing system 180 will now be described. Power source 18 provides torque to gear train 64 to rotate crankshaft 62. Connecting rod 74 and cross head 80 cooperate to axially displace plunger 42. As plunger 42 is moved from its retracted position toward its extended position during a pressurized fluid discharge stroke, a pressure differential across primary seal 104 is relatively low. More specifically, the pressure within central cavity 50 is at or near the maximum pressure magnitude of the discharged fluid. In addition, as previously mentioned, the pressure of the barrier fluid within barrier fluid cavity 156 is slightly greater than the peak discharge pressure. Accordingly, V-rings 116 are relatively relaxed. A thin film of barrier fluid adheres to plunger 42 and travels from barrier fluid cavity 156 into engagement with the components of primary seal 104 to lubricate the seal and charge the spaces between V-rings 116 with barrier fluid. Furthermore, because the pressure of the barrier fluid is greater than the peak pressure found within central cavity 50, any leakage of fluid that may occur involves flow of barrier fluid into the pumped fluid. Pumped fluid is not allowed to travel toward the more highly pressurized barrier fluid cavity 156. Based on this mode of operation, a barrier fluid is selected to exhibit properties that do not adversely affect the performance characteristics of the pumped fluid.

During the pressurized fluid discharge stroke previously described, a relatively large pressure differential exists across secondary seal 106 because leakage port 152 is maintained at atmospheric pressure. Due to the relatively large pressure differential, barrier fluid within barrier fluid cavity 156 may leak across secondary seal 106 through passageway 148, groove 150, leakage port 152 and into a collection tank 260. As previously mentioned, barrier fluid is an environmentally friendly fluid and a controlled and collected leak of this type of fluid does not raise environmental concerns.

Tertiary seal 108 acts as a wiper and operates in relatively clean conditions with relatively low differential pressure. Tertiary seal 108 functions to prevent leakage of the barrier fluid to atmosphere and to retain leaked fluid within passageway 148 and collection tank 260.

Continued rotation of crankshaft 62 causes plunger 42 to move from the extended position toward its retracted position during a suction stroke. The pressure within central cavity 50 is substantially lower than the pressure within barrier fluid cavity 156 during the suction stroke. At the same time, a relatively high differential pressure exists across primary seal 104 to cause V-rings 116 to compress. The compressed V-rings more tightly engage outer surface 102 of plunger 42. The combination of an energized primary seal 104, a relatively high differential pressure between barrier fluid cavity 156 and central cavity 50 and also the pre-charging of spaces between V-rings 116 with barrier fluid ensures that no pumped fluid will be carried into barrier fluid cavity 156. A cycle of discharge stroke and subsequent suction stroke is repeated as crankshaft 62 rotates.

FIG. 4 depicts an optional recharging circuit 280 operable to transfer leaked barrier fluid positioned within collection tank 260 into use within barrier fluid cavity 156. Recharging circuit 280 includes an inlet line 282 in communication with collection tank 260. Collected and previously leaked barrier fluid is drawn from collection tank 260 with a pump 284. Output from pump 284 is provided to inlet port 154 or somewhere along line 242. In this manner, power pump 10 and sealing system 180 may be left unattended for longer periods of time without requiring additional barrier fluid to be added.

Figure 6:
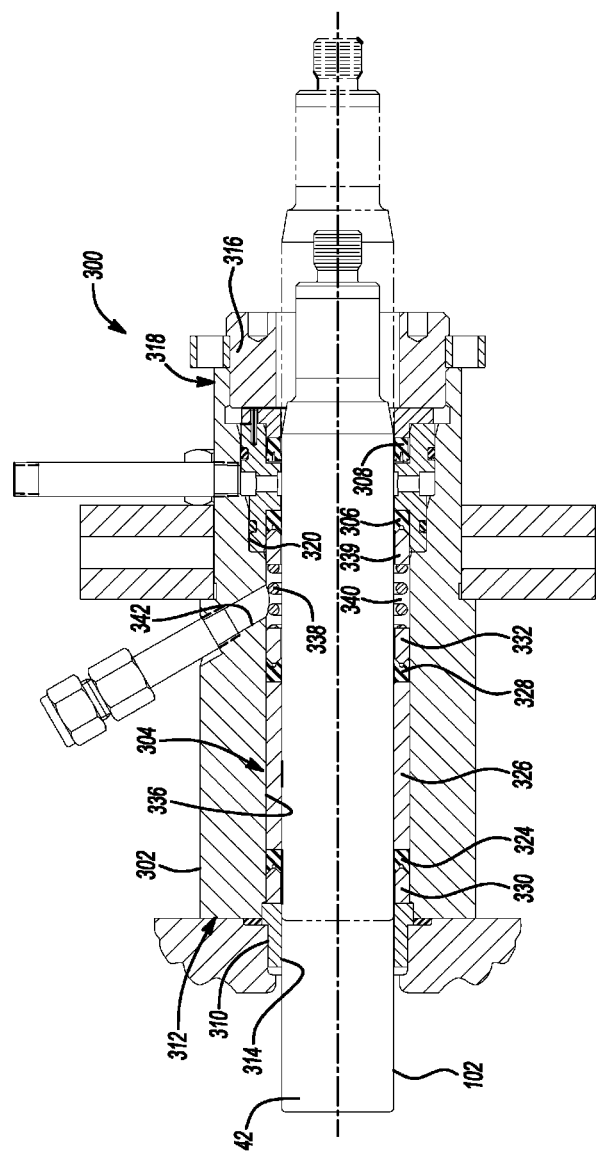
FIG. 6 is a fragmentary side view of an alternate stuffing box.

With reference to FIG. 6, an alternate stuffing box is depicted at reference numeral 300. Stuffing box 300 may be used within a sealing system substantially similar to sealing system 180 in lieu of stuffing box 44. Stuffing box 300 includes a cylinder 302 in receipt of a portion of plunger 42. As previously mentioned, plunger 42 includes a substantially constant outer diameter having an outer cylindrical surface 102.

Stuffing box 300 includes a primary seal 304, a secondary seal 306 and a tertiary seal 308 positioned within cylinder 302 in sealing engagement with outer surface 102. A throat bushing 310 is positioned at a first end 312 of cylinder 302. A bore 314 extends through throat bushing 310 and is sized to guide plunger 42 along its axis of translation. A threaded retainer 316 is fixed to an opposite end 318 of cylinder 302 and functions to retain secondary seal 306 and tertiary seal 308 within a counterbore 320 formed within cylinder 302.

Primary seal 304 includes a first elastomeric member or V-ring 324, a sleeve or bushing 326 and a second elastomeric member or V-ring 328 captured between a first end plate 330 and a second end plate 332. Each of the components of primary seal 304 are axially moveable within a bore 336 formed in cylinder 302. A spring 338 provides a predetermined compressive load to primary seal 304. Spring 338 also applies a compressive load to a third end plate 339 and secondary seal 306. As previously described in relation to stuffing box 44, the components of primary seal 304 and secondary seal 306 remain in axial compression during pump operation.

Second V-ring 328 and secondary seal 306 define a cavity 340. An inlet port 342 is in communication with cavity 340 and provides a fluid passage for highly pressurized barrier fluid to enter cylinder 302. Second V-ring 328 and secondary seal 306 function to retain the barrier fluid within cavity 340. The pressure within cavity 340 acts on second end plate 332, second V-ring 328, third end plate 339 and secondary seal 306. The force supplied by the pressurized fluid, as well as the force provided by spring 338, is translated through bushing 326 to first V-ring 324. Spring 338 provides a self-adjustment mechanism for primary seal 304 and secondary seal 306.

First V-ring 324 is axially spaced apart from second V-ring 328 a distance substantially equal to or greater than the maximum allowable stroke of plunger 42. Based on this relative positioning, portions of plunger 42 that are exposed to pumped fluid are prevented from axially travelling into a cavity 340 defined by second V-ring 328 and secondary seal 306. This sealing arrangement prevents the transport of pumped fluid that may collect within microscopic pores of plunger 42 into cavity 340. The remainder of stuffing box 300 is substantially similar to stuffing box 44 and a detailed description of each component will not follow. It should be appreciated, however, that the multiple element secondary seal 106 and multiple element tertiary seal 108 may be replaced by singular, monolithic (V) rings as depicted in FIG. 6.

In operation, plunger 42 is moved from a retracted position toward an extended position during a pressurized fluid discharge stroke. At this time, a pressure differential across primary seal 304 is relatively low. As was previously described in relation to stuffing box 44, some barrier fluid passes by second V-ring 328. A thin film of barrier fluid adheres to plunger 42 and travels from cavity 340 across second V-ring 328 and along a portion of surface 102 lying between first V-ring 324 and second V-ring 328. This flow of barrier fluid acts to wash plunger 42 and move any pumped fluid that may be positioned between first V-ring 324 and second V-ring 328 toward first end 312 of cylinder 302. The washing operation in combination with the spacing of first V-ring 324 from second V-ring 328 restricts and substantially eliminates the entry of pumped fluid into cavity 340. The integrity of the barrier fluid is maintained. The functions of secondary seal 306 and tertiary seal 308 are substantially similar to those previously described in relation to stuffing box 44.

As plunger 42 is moved from the extended position toward its retracted position during a suction stroke, a relatively high differential pressure exists across primary seal 304. Spring 338 and the pressure of the barrier fluid within cavity 340 causes second V-ring 328 and first V-ring 324 to compress. The compressed V-rings tightly engage outer surface 102 of plunger 42. Barrier fluid is now found not only within cavity 340 but also between first V-ring 324 and second V-ring 328. The tightly engaged V-rings, the relatively high differential pressure between barrier fluid cavity 340 and first end 312, and the pre-charging of any voids that may be present between first V-ring 324, bushing 326 and second V-ring 328 with barrier fluid, ensures that no pumped fluid will be carried into cavity 340.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A sealing system for a pump having a plunger, comprising:
    a housing having an internal chamber adapted to receive a portion of the plunger;
    a primary seal within the internal chamber and in sealing relation with the housing, the primary seal including first and second elastomeric members adapted to sealingly engage the plunger, the first and second elastomeric members being spaced apart from one another a distance greater than or equal to a maximum stroke of the plunger;
    a secondary seal located within the internal chamber and adapted to sealingly engage the plunger, the secondary seal being spaced apart from the primary seal;
    a barrier fluid chamber containing a barrier fluid in contact with the primary seal and the secondary seal; and
    a pressurizing device to maintain a pressure of the barrier fluid at a magnitude greater than a peak pressure of a fluid pumped by the plunger such that the pumped fluid is restricted from entering the barrier fluid chamber.

2. The sealing system of claim 1 wherein the primary seal is axially translatable within the internal chamber and further includes an axially translatable bushing adapted to surround the plunger and transfer a load between the first and second elastomeric members.

3. The sealing system of claim 2 further including a spring applying a compressive force to the first elastomeric member, the bushing, the second elastomeric member and the secondary seal.

4. The sealing system of claim 3 wherein the spring is positioned within the barrier fluid chamber.

5. The sealing system of claim 1 further including a tertiary seal being positioned within the internal chamber and adapted to engage the plunger at a location further from the primary seal than the secondary seal and a leakage port extending through the housing in communication with a portion of the internal chamber between the secondary and the tertiary seals.

6. The sealing system of claim 5 further including a collection tank in communication with the leakage port for receipt of barrier fluid that has leaked past the secondary seal.

7. The sealing system of claim 5 wherein the primary, secondary and tertiary seals each include an inner diameter sized to engage a plunger having a constant diameter along its length.

8. The sealing system of claim 1 further including a barrier fluid level indicator operable to output a signal indicative of the level of barrier fluid within the sealing system.

9. The sealing system of claim 1 further including a pressure referencing device being in communication with the pumped fluid and outputting fluid at a pressure magnitude equal to a peak pressure of the pumped fluid to the pressurizing device.

10. The sealing system of claim 1 further including a recharging circuit including a pump drawing fluid from a collection tank in receipt of barrier fluid that has previously leaked past the secondary seal, the pump reintroducing the previously leaked barrier fluid into the barrier fluid chamber.

11. A sealing system for a pump having a reciprocating plunger, comprising:
    a housing having an internal chamber adapted to receive a portion of the plunger;
    a primary seal positioned within the internal chamber in sealing relation with the housing and including first and second elastomeric members adapted to sealingly engage the plunger, the first and second elastomeric members being spaced apart from one another by an axially moveable sleeve a distance greater than or equal to a maximum stroke of the plunger;
    a secondary seal located within the internal chamber and adapted to sealingly engage the plunger, the secondary seal being spaced apart from the primary seal;
    a barrier fluid chamber containing a barrier fluid and being defined by the second elastomeric member and the secondary seal; and a pressurizing device to maintain a pressure of the barrier fluid at a magnitude greater than a peak pressure of a fluid pumped by the plunger such that the pumped fluid is restricted from entering the barrier fluid chamber.

12. The sealing system of claim 11 further including a spring applying a compressive load to the first elastomeric member via the sleeve and second elastomeric member.

13. The sealing system of claim 12 wherein the spring is positioned within the barrier fluid chamber.

14. The sealing system of claim 11 wherein the first and second elastomeric members are axially moveable within the internal chamber.

15. The sealing system of claim 11 further including a collection tank in communication with the leakage port for receipt of barrier fluid that has leaked past the secondary seal.

16. The sealing system of claim 11 wherein the first and second elastomeric members include V-rings.

17. The sealing system of claim 11 wherein the first elastomeric member is oriented to restrict flow of pumped fluid toward the second elastomeric member.

18. The sealing system of claim 17 wherein the second elastomeric member is oriented to restrict flow of barrier fluid toward the first elastomeric member.

19. The sealing system of claim 11 wherein a radial clearance exists between the sleeve and the housing as well as between the sleeve and the plunger.

\* \* \* \* \*